(12) United States Patent
Cleland

(10) Patent No.: US 10,899,597 B2
(45) Date of Patent: Jan. 26, 2021

(54) FLUID CONTROL SHUTOFF AND PUMP ASSEMBLY FOR A BEVERAGE DISPENSING MACHINE

(71) Applicant: James Cleland, Los Alamitos, CA (US)

(72) Inventor: James Cleland, Los Alamitos, CA (US)

(73) Assignee: Cleland Sales Corporation, Los Alamitos, CA (US)

( * ) Notice: Subject to any disclaimer, the term of this patent is extended or adjusted under 35 U.S.C. 154(b) by 296 days.

(21) Appl. No.: 15/932,362

(22) Filed: Feb. 16, 2018

(65) Prior Publication Data

US 2019/0256339 A1    Aug. 22, 2019

(51) Int. Cl.
*B67D 1/12* (2006.01)
*B67D 1/00* (2006.01)
*B23P 15/00* (2006.01)

(52) U.S. Cl.
CPC .......... *B67D 1/1281* (2013.01); *B23P 15/001* (2013.01); *B67D 1/0015* (2013.01); *B67D 1/1247* (2013.01)

(58) Field of Classification Search
CPC .. B67D 1/1281; B67D 1/0015; B67D 1/1247; B67D 1/0037; B67D 1/10; B67D 1/0021; B67D 1/0871; B67D 1/107; B67D 1/1245; B67D 1/0016; B23P 15/001
See application file for complete search history.

(56) References Cited

U.S. PATENT DOCUMENTS

| | | |
|---|---|---|
| 2,865,534 A | 12/1958 | Barnes |
| 4,406,382 A | 9/1983 | Roth |
| 4,467,941 A | 8/1984 | Du |
| 4,544,328 A | 10/1985 | Credle, Jr. |
| 4,684,332 A | 8/1987 | Hartley et al. |
| 5,215,128 A | 6/1993 | Neeser |
| 5,249,706 A | 10/1993 | Szabo |

(Continued)

FOREIGN PATENT DOCUMENTS

| | | |
|---|---|---|
| GB | 1189332 | 4/1970 |
| GB | 2028767 B | 3/1980 |

OTHER PUBLICATIONS

SHURflo, Heavy Duty Advantage BIB Gas Pump, Sep. 27, 2017, 2 pgs.

(Continued)

*Primary Examiner* — Lee A Holly
(74) *Attorney, Agent, or Firm* — Fish IP Law, LLP

(57) ABSTRACT

A shutoff switch for dispensing mixed beverages is presented. The shutoff switch includes a syrup inlet receiving syrup and a syrup outlet dispensing the syrup to a pump. The shutoff switch also includes a water inlet receiving water, and a water outlet dispensing the water to a either the pump or a dispensing point. Two distinct inlets and outlets for syrup and water prevent the syrup and water being mixed in the shutoff switch. The shutoff switch further includes a pressure responsive member that deforms based on pressure changes in the shutoff switch. When the deformation of the pressure responsive member reaches a threshold, an electrical gate in direct communication with the pressure responsive member opens, turning of a pump of the beverage dispensing system. Valves in either chamber of the shutoff switch can also be used as a redundant mechanical way to stop flow in the system.

14 Claims, 2 Drawing Sheets

(56) References Cited

U.S. PATENT DOCUMENTS

| | | | |
|---|---|---|---|
| 5,299,715 A | | 4/1994 | Feldman |
| 5,314,703 A | * | 5/1994 | Gibney ................ B67D 1/0016 |
| | | | 426/231 |
| 5,316,180 A | | 5/1994 | Cleland |
| 5,445,186 A | | 8/1995 | Richter et al. |
| 5,476,193 A | * | 12/1995 | Haynes ................ B67D 1/107 |
| | | | 222/129.2 |
| 5,505,593 A | | 4/1996 | Hartley et al. |
| 5,842,603 A | | 12/1998 | Schroeder et al. |
| 5,961,300 A | | 10/1999 | Pitzer et al. |
| 6,293,430 B1 | | 9/2001 | Haselden, Jr. |
| 8,876,488 B2 | | 11/2014 | Fong |
| 9,316,214 B2 | | 4/2016 | Du |
| 2010/0002342 A1 | | 1/2010 | Carlson et al. |

OTHER PUBLICATIONS

SHURflo, Post-Mix BIB Dispensing System, Sep. 27, 2017, 2 pgs.
SHURFLO Black Brix Pump, 4:1 Ratio, 94-263-03, 1 pg.
SHURflo, BIB Gas Pump and Operation, Sep. 27, 2017, 2 pgs.

\* cited by examiner

FLUID CONTROL SHUTOFF AND PUMP ASSEMBLY FOR A BEVERAGE DISPENSING MACHINE

FIELD OF THE INVENTION

The present invention relates to beverage dispensing assemblies, more specifically, a beverage dispensing assembly with a post-mix nozzle and a pump and valve assembly and methods for automatic shutoff of diluents flowing through beverage dispensing assemblies when a source of syrup is depleted.

BACKGROUND

The following description includes information that may be useful in understanding the present invention. It is not an admission that any of the information provided herein is prior art or relevant to the presently claimed invention, or that any publication specifically or implicitly referenced is prior art.

Post-mix beverage dispensing assemblies that include separate sources for syrup and water are generally known in the art. In these assemblies, syrups from a bag in box syrup source and carbonated water from the carbonated water source are mixed in a nozzle and then flow into a container. However, these assemblies fail to provide a system to monitor and coordinate dispensing of syrup and carbonated water. Thus, when the amount of the syrup in the syrup source is low, these assemblies often allow the carbonated water to flow through the nozzle without being mixed with the syrup, which may unfavorably result in dispensing beverages without syrups mixed therein.

Many technologies have been developed to use a vacuum to control beverage dispensing when the syrup level is low. For example, U.S. Pat. No. 5,215,128 to Nesser utilizes a ball in the supply line. In this system, the ball in the supply line drops as the tank is being emptied and a vacuum is created in the supply line by the dropped ball. Then, the valve senses the vacuum such that the valve changes over to the other syrup supply tank. For another example, U.S. Pat. No. 4,467,941 to Du discloses a low flow rate, positive displacement pump. In this system, air ingestion into the dispensing system is eliminated by use of a novel air trap/filter adapted to generate a high vacuum signal at the intake port of the pump in response to detecting the presence of air or encountering a syrup depletion condition which signal automatically discontinues pump operation.

Some have sought to solve the problem by utilizing a syrup dosing valve. For example, U.S. Pat. No. 5,299,715 to Feldman discloses a pressure sensitive element that detects the syrup supply level, which disables operation via shut-off valve through solenoid once pressure in the line drops as a result of the syrup reservoir becoming empty. For another example, U.S. Pat. No. 5,316,180 to Cleland discloses a syrup-actuated switching device. In this device, a float is buoyed and pivoted up by syrup in the chamber to a nearly horizontal position where the magnet actuates the switch to a closed position. When the supply of syrup to the machine is exhausted, the float pivots downwardly, moving the magnet away from the switch and causing the switch to open.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

However, none of the above systems can be effectively used in an open beverage system or be controlled using indirect contact with fluids in the beverage system. Thus, there is still a need for improved system and methods for controlling beverage dispensing.

SUMMARY OF THE INVENTION

The inventive subject matter provides a beverage shutoff systems and devices, and methods for dispensing beverage from a syrup tank.

Shutoff switches of the inventive subject matter have a housing with a first inlet and a first outlet. The first inlet receives a first fluid (e.g., a beverage concentrate, etc) from upstream of the housing and the first outlet passes the first fluid downstream of the housing. A first cavity (or chamber, etc) fluidly couples the first inlet to the first outlet, through which the first fluid flows. A pressure responsive member (e.g., elastic diaphragm, elastic membrane, etc) is (at least partially) incorporated in the housing and is (at least partially) in direct fluid communication with the first cavity. At rest, the pressure responsive member is biased toward a first position, and translates to a second position in response to a pressure change in the cavity. An electrical gate in (at least partial) communication with the pressure responsive member is operated (e.g., open, closed, etc) by translation of the pressure responsive member between the first and second positions. Preferably, the electrical gate is external to the housing, or is in indirect communication with the pressure responsive member.

It is contemplated the pressure responsive member closes the electrical gate when in the first position and opens the gate when in the first position, or vice versa. Likewise, an intermediary translation between the first and second positions (e.g., midpoint between first and second positions) can operate the electrical gate.

In some embodiments, the housing also has a second cavity (or chamber, etc) in fluid communication with a second inlet and a second outlet on the housing. While the first and second cavities of the housing can be in partial communication with each other, in preferred embodiments the first and second cavities are fluidly sealed from each other. Generally, the second inlet receives a second fluid (e.g., diluent) from a source, which is preferably different than the source for the first fluid.

The pressure change in the first cavity is typically from a sub-ambient pressure condition to at least an ambient pressure condition. Such pressure change generally occurs when a volume of the first fluid in an upstream source (e.g., reservoir upstream of the housing) is greater than 80% of the source volume, when the flow rate of the first fluid is within 10% of a target flow rate, when the pressure of the first fluid is within 10% of a target pressure, when the temperature of the first fluid is within 10% of a target pressure, or some combination thereof. However, the pressure change in the first cavity can also be from a supra-ambient pressure condition to a sub-ambient pressure condition. In that case, the pressure change generally occurs when a volume of the first fluid in an upstream source is lower than 20% of the source volume, when the flow rate of the first fluid is not within 50% of a target flow rate, when the pressure of the first fluid is not within 50% of a target pressure, when the temperature of the first fluid is not within 50% of a target pressure, or some combination thereof.

It is contemplated that a shutoff switch of the inventive subject matter can be incorporated into beverage dispensing systems. Such systems typically include a pump, a reservoir, and the shutoff switch, with the first inlet of the shutoff switch fluidly coupled to the reservoir, and the first outlet of the shutoff switch fluidly coupled to the pump.

Methods are contemplated for modifying a valve device for further use as a pressure switch. Appropriate valve devices typically have a pressure responsive member that translates between a first and a second position in response to a pressure. For such valve devices, an actuator is disposed in (preferably direct) tactile communication with the pressure responsive member, such that the actuator moves in response to translation of the pressure responsive member between the first and second positions, with such movement of the actuator operating an electrical gate of the pressure switch. In some embodiments, the actuator is housed in a housing, and the housing is coupled to the valve. The electric gate of the pressure switch controls (e.g., toggles, throttles, etc) a flow of electrical current to a pump. Viewed from another perspective, the pressure responsive member controls a flow of fluid through a pump.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1A:
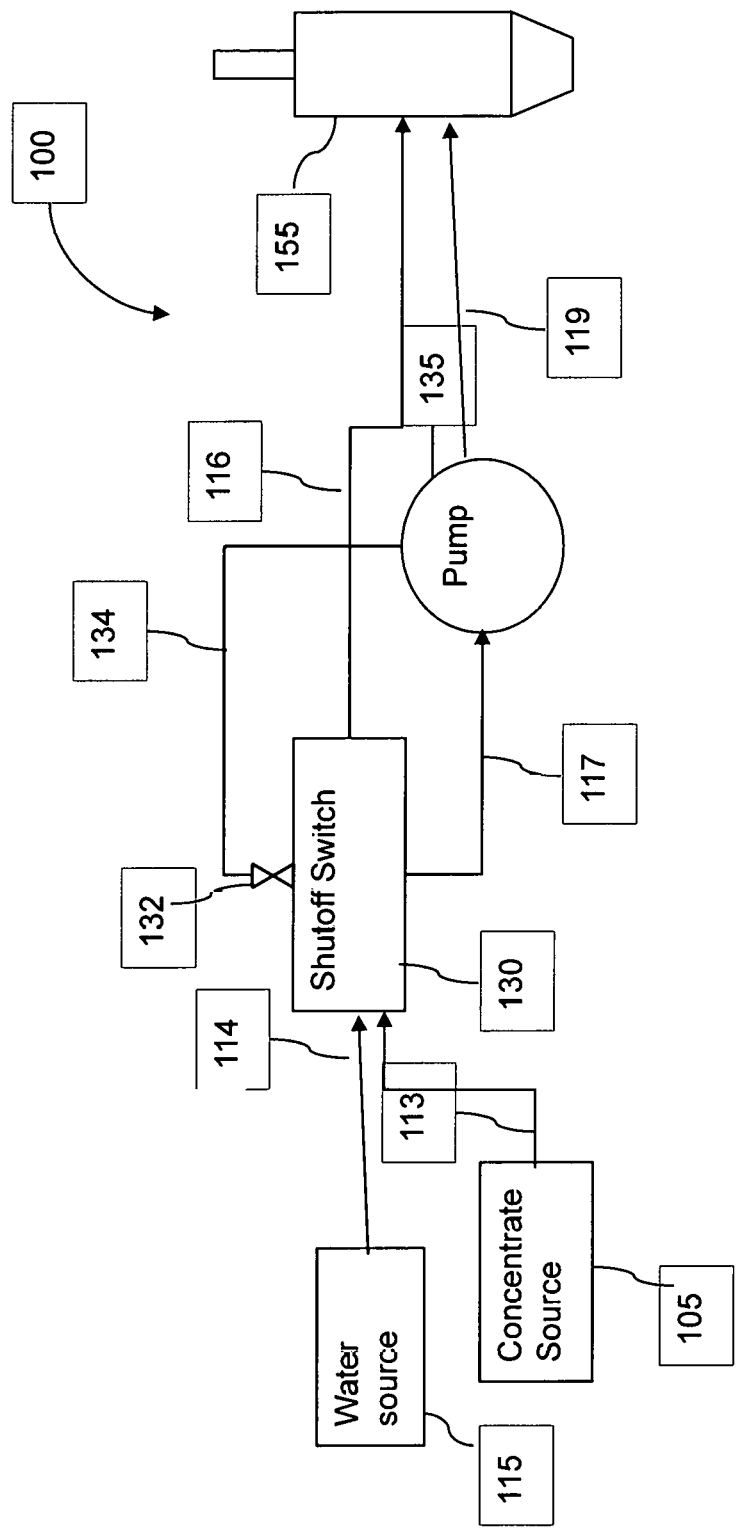
FIG. 1A illustrates a schematic diagram of one embodiment of a beverage dispensing system.

The inventive subject matter provides apparatus, systems, and methods in which diluent flow through a beverage dispensing system can be controlled to prevent dispensing over-diluted beverage, or to otherwise stop fluid flow in the system.

Flow of fluids (e.g., diluents, water, concentrate, syrups, etc) in beverage dispensing systems of the inventive subject matter is at least partially controlled by shutoff switches. The shutoff switches have a housing with a first inlet and a first outlet. The first inlet receives a first fluid from upstream of the housing and the first outlet passes the first fluid downstream of the housing. The first fluid can be a diluent (e.g., water, carbonated water, alkaline water, seltzer water, tonic water) or a concentrate (e.g., syrup, gel, alcohol, juice, tea, coffee, etc). A first chamber through the housing fluidly couples the first inlet to the first outlet, through which the first fluid flows.

A pressure responsive member is incorporated in the housing and is in direct fluid communication with the first chamber. Appropriate pressure responsive members are contemplated such that the pressure responsive member conveys (e.g., mechanically) a change of pressure inside the first chamber to an electrical gate outside of the first chamber. For example, pressure responsive members can be embedded in a wall of the first chamber and oscillate in response to pressure changes (e.g., diaphragms or detents made of or restricted in motion by flexible materials (elastics, rubbers, plastics, fibers, springs, elastic alloys, etc) or repulsive elements (e.g., magnets)).

At rest, the pressure responsive member is biased toward a first position or conformation, for example extending outward from a wall of the chamber or the housing, flush with a wall of the chamber or exterior wall of the housing, or receding from a wall of the chamber or the housing toward the interior of the chamber. In response to a pressure change in the chamber (or pressure change outside of the housing), the pressure responsive member translates to a second position or conformation, for example extending outward from a wall of the chamber or the housing, flush with a wall of the chamber or exterior wall of the housing, or receding from a wall of the chamber or the housing toward the interior of the chamber. In preferred embodiments, the first position is flush with a wall of the chamber or the housing and the second position is receding from a wall of the chamber or the housing toward the interior of the chamber, or the first position is extending outward from a wall of the chamber or the housing and the second position is flush with a wall of the chamber or the housing or receding from a wall of the chamber or the housing toward the interior of the chamber. Viewed from another perspective, the translation of the pressure responsive member from the first position or conformation to the second position or conformation is mechanically detectable from outside of the chamber or housing.

An electrical gate in communication with the pressure responsive member is operated (e.g., open, closed, etc) by translation of the pressure responsive member between the first and second positions. Preferably, the electrical gate is external to the housing, or is in indirect communication with the pressure responsive member.

It is contemplated the pressure responsive member closes the electrical gate when in the first position and opens the gate when in the first position, or vice versa. Likewise, an intermediary translation between the first and second positions (e.g., midpoint between first and second positions) can operate the electrical gate. Thus, it should be appreciated that a change in the pressure responsive member's confirmation (protruding, receding, flush, intermediary, etc) opens and closes the electrical gate.

In some embodiments, the housing also has a second chamber in fluid communication with a second inlet and a second outlet on the housing. While the first and second chambers of the housing can be in partial communication with each other, in preferred embodiments the first and second chambers are fluidly sealed from each other. Generally, the second inlet receives a second fluid (e.g., diluent) from a source, which is preferably different than the source for the first fluid. It should be appreciated that such embodiments allow for two different fluids, each fluid associated with its own fluid lines and its owner properties (e.g., pressure, temperature, viscosity, flow rate, etc) to pass through the same housing. As the first and second chambers are in partial communication with each other, it is contemplated that a change in pressure (or other property) in the second chamber is detectable in the first chamber. Thus, in preferred embodiments a change in pressure in the second chamber operates electrical gate via the pressure responsive member of the first chamber. Viewed from another perspective, use of two fluid chambers in partial communication with each other allows for pressure changes in one chamber to be communicated to another chamber, and thus operate an electrical gate.

The pressure change in the first chamber is typically from a sub-ambient pressure condition to at least an ambient pressure condition. Such pressure change generally occurs when a volume of the first fluid in an upstream source (e.g., reservoir upstream of the housing) is greater than 80% of the source volume, when the flow rate of the first fluid is within 10% of a target flow rate, when the pressure of the first fluid is within 10% of a target pressure, when the temperature of the first fluid is within 10% of a target pressure, or some combination thereof. In such scenarios, the pressure change causes the pressure responsive member to translate between a resting position and a stressed position (e.g., from first position (stressed) to second position (resting)), thus closing the electrical gate, and providing electrical power to a pump. In embodiments with first and second chambers in partial communication with each other, each with its own fluid, pressure changes in the second chamber can be communicated to the first chamber, and thus close the electrical gate and turn on the pump.

The pressure change in the first chamber can also be from an at most supra-ambient pressure condition to an at most sub-ambient pressure condition. In that case, the pressure change generally occurs when a volume of the first fluid in an upstream source is lower than 20% of the source volume, when the flow rate of the first fluid is not within 50% of a target flow rate, when the pressure of the first fluid is not within 50% of a target pressure, when the temperature of the first fluid is not within 50% of a target pressure, or some combination thereof. In such scenarios, the pressure change causes the pressure responsive member to translate between a resting position and a stressed position (e.g., from first position (resting) to second position (stressed)), thus opening the electrical gate, and turning off the pump. In embodiments with first and second chambers in partial communication with each other, each with its own fluid, pressure changes in the second chamber can be communicated to the first chamber, and thus open the electrical gate and turn off the pump.

It should be appreciated that shutoff switches of the inventive subject matter allow for flow in a beverage dispensing system to be controlled electronically, rather than mechanically. Preferred shutoff switches all pressure changes in the beverage system to be monitored without having the shutoff switch in direct contact with the fluids in the chambers. Viewed from another perspective, using a pressure responsive member in the wall of the shutoff switch permits a pump to be turned on or off indirectly via a deformation in the pressure responsive member. Using indirect detection of pressure changes in the chamber to electronically turn a pump on or off avoids complications or mechanical failures that can occur if, for example, a mechanical valve is used to control flow in the beverage system.

It is contemplated that a shutoff switch of the inventive subject matter can be incorporated into beverage dispensing systems. Such systems typically include a pump, a reservoir, and the shutoff switch, with the first inlet of the shutoff switch fluidly coupled to the reservoir, and the first outlet of the shutoff switch fluidly coupled to the pump. The electrical gate of the shutoff switch is opened and closed to control the pump. When a pressure change in the shutoff switch (e.g., increase or decrease of pressure to above or below ambient pressure, in either a first or second chamber in the shutoff switch) occurs, the pressure responsive member of the switch opens (e.g., decreased pressure in the chamber) or closes (e.g., increased pressure in the chamber) the electrical gate, turning the pump off or on, respectively. It should be appreciated that two-chamber shutoff switches advantageously allows two different fluid lines to be monitored for conditions that should turn off the pump (e.g., pressure drop in a line, temperature increase in a line, flow rate decrease in a line, vacuum pressure in a line, etc).

Methods are contemplated for modifying a valve device for further use as a pressure switch. Appropriate valve devices typically have a pressure responsive member that translates between a first and a second position in response to a pressure. For such valve devices, an actuator is disposed in (preferably direct) tactile communication with the pressure responsive member, such that the actuator moves in response to translation of the pressure responsive member between the first and second positions, with such movement of the actuator operating an electrical gate of the pressure switch. The electric gate of the pressure switch controls (e.g., toggles, throttles, etc) a flow of electrical current to a pump. Viewed from another perspective, the pressure responsive member controls a flow of fluid through a system by automatically turning a pump off or on.

Beverage dispensing systems with an open source syrup tank can include shutoff switches that respond to a level of the syrup contained in the open source syrup tank. Syrups can be delivered to the system via any appropriate source, including canisters, tubes, cartridges, pressurized vessels, bladders, or via a bag-in-a-box. It is contemplated that such sources may be self-pressurized, may be pressurized by a pump, or may rely upon gravity to propel the syrup into the system.

Shutoff switches of the inventive subject matter can further incorporate shutoff valves within the housing, either in the first chamber, the second chamber, or both. Shutoff valves can be used to prevent or permit flow of fluids through a chamber, preferably in conjunction with the shutoff switch opening or closing the electrical gate, respectively. Use of indirect monitoring of pressure changes in chambers of the switch to electronically control a pump in combination with mechanical valves in direct contact with the fluids allows for redundancy in stopping flow in the system. For example, if the mechanical valve fails to close in response to a pressure change, deformation of the pressure responsive member can still electronically turn off the pump. Likewise, if the electronic system has a short or malfunction, the mechanical valve can still respond to pressure changes in the chamber to prevent flow in the system. This redundancy provides further benefit in beverage systems that use two or more fluids when the shutoff switch includes two or more chambers, as a single pressure defect of any fluid in the system can be trigger either a mechanical or electronic shutdown of the system, or both.

FIG. 1A is a schematic of the beverage dispensing system 100, which mixes concentrate (e.g., syrup) with water (or other diluent) at the dispensing tap 155 before dispensing the mix as a beverage. The beverage dispensing system 100 includes a shutoff switch 130 which receives concentrate from concentrate source 105 via concentrate fluid line 113, and water from water source 115 through the water fluid line 114.

Concentrate source 105 can be any type of concentrate source, including those that are not sealed from ambient air. For example, the concentrate source 105 can be concentrate partially exposed to air, moisture, pressure, or temperature conditions outside of the container where the concentrate is contained, or it can be (at least partially) sealed from conditions outside the container. Any suitable type of materials can be used for containers of concentrate source 105. For example, the container can comprise one or more of various materials including wooden materials, metals, plastics, rubbers, paper, glass, etc.

The water source 115 can be any water reservoir or supply of water that is suitable for human consumption (e.g., city water, tap water, etc). For example, water source 115 can store or supply pressurized water, typically pressurized to at least 30 psi, preferably at least 45 psi, more preferably at least 60 psi, and in some cases at least 80 psi. Water source 115 can be pressurized by appropriate means, including gravity or by pump.

Optionally, the water source 115 can be coupled with a carbonator to supply carbonated water to the dispenser 155. For example, the water from the water source 115 can flow through an optional carbonator to the shutoff switch 130. Any suitable, commercially available carbonators are contemplated. In a preferred embodiment, a carbonator can be a motorized carbonator that is configured to diffuse $CO_2$ gas to the water and pump the water at more than 80 psi, and preferably more than 150 psi.

The shutoff switch 130 has a concentrate inlet to receive concentrate from concentrate fluid line 113 into a concentrate chamber, and a concentrate outlet to send the concentrate from the concentrate chamber to pump 135 via concentrate fluid line 117. The shutoff switch 130 also has a water inlet to receive water from the water source into a water chamber, and a water outlet to send the water from the water chamber to the dispenser 155 via water fluid line 116. As mentioned, the shutoff switch 130 has two separate internal chambers, each of which is coupled either the concentrate inlet and outlet or the water inlet and outlet. The internal chambers are in partial communication with each (e.g., common diaphragm, common piston, etc) but are preferably not fluidly coupled, such that water and concentrate flowing into shutoff switch 130 are not mixed inside of shutoff switch 130. Either the concentrate chamber or the water chamber can further include a valve to mechanically control flow in the chamber.

Shutoff switch 130 further includes a pressure responsive member, typically disposed on a wall of the concentrate chamber. As pressure in the concentrate chamber changes, the pressure responsive member deforms. For example, if the pressure increases, the pressure responsive member bulges from the side of shutoff switch 130, and when the pressure decreases, the pressure responsive member recedes into the concentrate chamber. In both the bulging and receding deformations, the pressure responsive member is in a stressed state. It is contemplated that the pressure responsive member is flush with the wall of the shutoff switch when the pressure responsive member is in a resting state, typically between ambient pressure and 200 psi. The pressure responsive member typically will not bulge unless the psi is far too high for the system, and there is a risk of damage or failure, for example in excess of 300 psi. The pressure responsive system will recede if the pressure decreases below ambient pressure, at least 90% ambient pressure, 80% ambient pressure, 70% ambient pressure, 60% ambient pressure, or less than 50% ambient pressure.

As the pressure responsive member translates between bulging and receding deformations, electrical gate 132 is mechanically switches between open (bulging or receding) and closed (resting, or within tolerable range from resting) confirmations. In the open confirmation, no electricity flows to pump 135 via electrical line 134, and the pump is off. In the closed confirmation, electricity flows to pump 135 via electrical line 134, and the pump is on. In preferred embodiments where the pressure responsive member has a maximum deformation (either bulge or receding) of α, electrical gate 132 remains in the closed confirmation unless the deformation (either bulge or receding) reaches more than 30% α, more typically 40% α, in preferred embodiments 50% α, and in high tolerant pump systems more than 75% α.

It is contemplated that, in conjunction with the deformation of the pressure responsive member (e.g., bulge or receding), a valve inside shutoff switch 130 oscillates between flow and no-flow confirmation in either the concentrate chamber or the water chamber (or both). For example, if the deformation of the pressure responsive member reaches a threshold (e.g., 90% α) yet the pump has not turned off, the valve can close to prevent flow of either concentrate or water (or both) through the switch. It should be appreciated that such a valve can be used as an emergency redundant system to prevent damage to the beverage systems from pressures that are too great or are too low.

In a preferred embodiment, the concentrate sent out from the shutoff switch 130 to the pump 135 via fluid line 117 is further pressurized by compressed gas in the pump 135 before dispensed out to the dispenser 155. In this embodiment, the pump 135 is fluidly coupled with a compressed gas supplier which contains compressed gas (e.g., $CO_2$, Nitrogen, or some combination thereof). The compressed gas supplied from the compressed gas supplier drives the pump 135 with a steady supply of concentrate under a predetermined pressure (e.g., at least 30 psi, preferably at least 60 psi, more preferably at least 90 psi, etc.) to the dispenser 155. In some embodiments, the predetermined pressure for supplying the concentrate is determined based on the pressure of the water supplied to the dispenser 155. In other embodiments, the predetermined pressure for supplying the concentrate can be determined independently from the pressure of the water supplied to the dispenser 155.

Any suitable type of pump is contemplated. For example, the pump 135 can be a SHURflo® heavy duty gas driven diaphragm pump for dispensing bag-in-box syrups, wines, teas, juices, milk, and water. Preferably, pump 135 features automatic demand and automatic shut-off for ease of operation. For example, when the concentrate supply is constant and continuous, the pump 135 automatically draws off the compressed gas from the compressed gas supplier 140. When the concentrate level is low or the supply of the concentrate to the pump 135 is not constant or continuous, the pump 135 shuts off automatically so that the pump 135 does not operate without concentrate to dispense to the dispenser 155.

Any suitable type of compressed gas can be used to pressurize the syrup in the pump 135.

For example, the compressed gas can be carbon dioxide ($CO_2$), nitrogen, clean compressed air, or any mixtures of those gases.

Figure 1B:
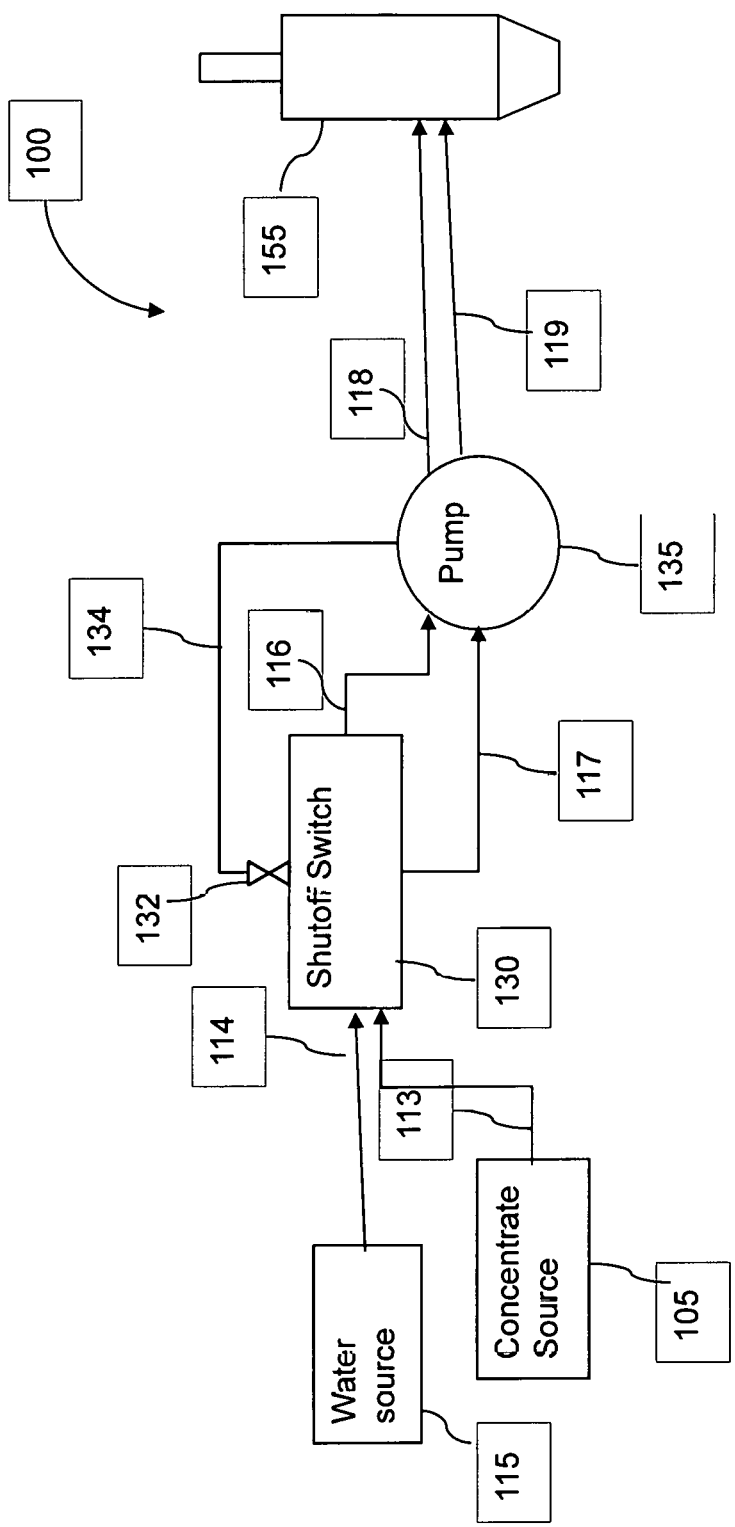
FIG. 1B illustrates a schematic diagram of another embodiment of a beverage dispensing system.

FIG. 1B is another schematic of beverage dispensing system 100. Similarly numbered elements in FIG. 1A are as described. The primary difference in system 100 of FIG. 1B is that both concentrate and water flow from shutoff switch 130 to pump 135, via water fluid line 116 and concentrate fluid line 117. Such system configuration presents further advantages. For example, where pump 135 is used to draw both concentrate and water from their respective sources, when a pressure change in shutoff switch 130 causes electrical gate 132 to open, shutting off pump 135, flow of both concentrate and water will stop. Thus, it should be noted that the system of FIG. 1A is better suited to applications where the water is pressurized (e.g., at water source 115), while FIG. 1B can pressurize both fluids via pump 135.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of properties such as dimensions used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A shutoff switch comprising:
   a housing comprising a first inlet that receives a first fluid from upstream of the first inlet, a first outlet that passes the first fluid downstream of the first outlet, and a cavity fluidly coupling the first inlet to the first outlet;
   a pressure responsive member in direct fluid communication with the cavity, and biased to a first position;
   wherein the pressure responsive member translates to a second position in response to a pressure change in the cavity; and
   an electrical gate operated by movement of the pressure responsive member;
   wherein the housing contains a first chamber in fluid communication with the first inlet and the first outlet, and a second chamber in fluid communication with a second inlet and a second outlet, wherein the first and second chambers are fluidly sealed from each other.

2. The shutoff switch of claim 1, wherein the pressure change is from a sub-ambient pressure condition to at least an ambient pressure condition in the cavity.

3. The shutoff switch of claim 2, wherein the pressure change occurs when a volume of the first fluid in a reservoir upstream of the first inlet is greater than 80% of an entire volume of the reservoir.

4. The shutoff switch of claim 1, wherein the pressure change is from a supra-ambient pressure condition to a sub-ambient pressure condition in the cavity.

5. The shutoff switch of claim 4, wherein the pressure change occurs when a volume of the first fluid in a reservoir upstream of the first inlet is lower than 20% of an entire volume of the reservoir.

6. A beverage dispensing system comprising a pump, a reservoir, and the shutoff switch of claim 1, wherein the first inlet of the shutoff switch is fluidly coupled to the reservoir, and the first outlet of the shutoff switch is fluidly coupled to the pump.

7. The beverage dispensing system of claim 6, wherein the first fluid comprises a beverage concentrate.

8. The shutoff switch of claim 1, wherein the pressure responsive member closes the electrical gate when in the first position.

9. The shutoff switch of claim 1, wherein the pressure responsive member opens the electrical gate when in the first position.

10. The shutoff switch of claim 1, wherein the second inlet receives a diluent from a diluent source.

11. The shutoff switch of claim 1, wherein the pressure responsive member comprises an elastic membrane in direct fluid communication with the cavity.

12. The shutoff switch of claim 1, wherein the first fluid is a beverage concentrate.

13. The shutoff switch of claim 1, wherein the electrical gate is external to the housing.

14. The shutoff switch of claim 1, wherein the electrical gate is in indirect communication with the pressure responsive member.

* * * * *